(12) United States Patent
Li et al.

(10) Patent No.: US 9,955,542 B2
(45) Date of Patent: Apr. 24, 2018

(54) APPARATUS AND METHOD FOR DRIVING LED DISPLAY PANEL

(71) Applicant: SCT TECHNOLOGY, LTD., Grand Cayman (KY)

(72) Inventors: Eric Li, Milpitas, CA (US); Shang-Kuan Tang, Fremont, CA (US); Wenjie Yang, Meizhou (CN); Lei Shen, Chengdu (CN); Yi Zhang, San Jose, CA (US); Yutao Chen, Meizhou (CN); Shahnad Nadershahi, Simi Valley, CA (US)

(73) Assignee: SCT TECHNOLOGY, LTD., Grand Cayman (KY)

( * ) Notice: Subject to any disclaimer, the term of this patent is extended or adjusted under 35 U.S.C. 154(b) by 0 days.

(21) Appl. No.: 15/237,040

(22) Filed: Aug. 15, 2016

(65) Prior Publication Data

US 2016/0353539 A1     Dec. 1, 2016

Related U.S. Application Data

(62) Division of application No. 13/684,197, filed on Nov. 22, 2012, now Pat. No. 9,485,827.

(51) Int. Cl.
*H05B 33/00* (2006.01)
*H05B 33/08* (2006.01)
*G09G 3/32* (2016.01)

(52) U.S. Cl.
CPC .......... *H05B 33/0845* (2013.01); *G09G 3/32* (2013.01); *H05B 33/086* (2013.01); *H05B 33/0815* (2013.01); *G09G 2310/0267* (2013.01); *G09G 2310/08* (2013.01); *G09G 2320/064* (2013.01)

(58) Field of Classification Search
CPC ............... H02M 3/157; H02M 1/0845; H02M 2001/008; H02M 2001/0012; H02M 2001/007; H02M 3/156; H02M 3/1588; H02M 2001/0074; H02M 3/1582; H02M 3/1584; H02M 3/33592; H05B 33/0866; H05B 33/0818
See application file for complete search history.

(56) References Cited

U.S. PATENT DOCUMENTS

| | | |
|---|---|---|
| 5,552,677 A | 9/1996 | Pagones |
| 6,339,415 B2 | 1/2002 | Ishizuka |
| 6,747,617 B1 | 6/2004 | Kawashima |
| 7,015,882 B2 | 3/2006 | Yumoto |

(Continued)

*Primary Examiner* — Monica C King
(74) *Attorney, Agent, or Firm* — Novick, Kim & Lee, PLLC; Allen Xue

(57) ABSTRACT

The present disclosure provides devices, circuits, and methods for driving an LED display panel, so as to ensure the delivery of equal global charge at minimum gray scale. In one example, the circuit of the present disclosure includes a current source, a detection module, and a measurement module. The current source is configured to generate a current signal for the LEDs. The detection module is configured to detect a forward voltage of the LEDs in response to a low current applied to the LEDs. The detection module is further configured to hold the detected forward voltage. The measurement module is configured to measure a time period for an anode voltage of the LEDs to rise to the detected forward voltage in response to a display current applied to the LEDs.

10 Claims, 4 Drawing Sheets

(56) References Cited

U.S. PATENT DOCUMENTS

| | | |
|---|---|---|
| 7,019,721 B2 | 3/2006 | Thielemans et al. |
| 7,126,568 B2 | 10/2006 | LeChevalier |
| 7,277,073 B2 | 10/2007 | Hattori |
| 7,385,575 B2 | 6/2008 | Seto |
| 7,446,744 B2 | 11/2008 | Klein et al. |
| 8,143,794 B1 | 3/2012 | Li et al. |
| 8,334,660 B2 | 12/2012 | Li et al. |
| 8,525,424 B2 | 9/2013 | Li et al. |
| 2003/0090455 A1 | 5/2003 | Daly |
| 2003/0156101 A1 | 8/2003 | LeChevalier |
| 2005/0052141 A1 | 3/2005 | Thielemans et al. |
| 2005/0140610 A1 | 6/2005 | Smith et al. |
| 2007/0152923 A1 | 7/2007 | Baik et al. |
| 2008/0111773 A1 | 5/2008 | Tsuge |
| 2008/0191642 A1 | 8/2008 | Slot et al. |
| 2009/0079358 A1* | 3/2009 | Shteynberg ........ H05B 33/0818 315/291 |
| 2010/0289424 A1 | 11/2010 | Chang et al. |
| 2011/0163941 A1 | 7/2012 | Li |
| 2012/0176062 A1 | 7/2012 | Sato et al. |
| 2012/0326632 A1 | 12/2012 | Kitagawa |
| 2012/0327129 A1 | 12/2012 | Li et al. |

* cited by examiner

APPARATUS AND METHOD FOR DRIVING LED DISPLAY PANEL

This application is a divisional application of U.S. application Ser. No. 13/684,197 filed on Nov. 22, 2012, the content of which is incorporated herein by reference in its entirety.

TECHNICAL FIELD

The present disclosure relates generally to devices, circuits, and methods for driving light emitting diode (LED) display panels. More particularly, the present disclosure relates to devices, circuits, and methods for driving the LED display panels, so as to ensure the delivery of equal global charge at minimum gray scale.

BACKGROUND

Recently, light emitting diodes (LEDs) have been widely used in electronic devices and applications. For example, LEDs have been used as light sources for general illumination. Additionally, LEDs have been used to make display panels, televisions, etc. Regardless of the applications, driving circuits are required to supply power to the LEDs and to control the LEDs to illuminate light with the desired brightness.

An LED display panel generally refers to a device which comprises an array of LEDs that are arranged in one or more rows and columns. Alternatively, an LED display panel may include a plurality of sub-modules, each sub-module having one or more such LED arrays. LED panels may employ arrays of LEDs of a single color or different colors. When LEDs of the same color are used in certain display applications, each LED normally corresponds to a display unit or pixel. When LED panels employ LEDs of different colors, a display unit or pixel normally includes a cluster of three LEDs, which may include a red LED, a green LED, and a blue LED. Such a cluster of three LEDs may be referred to as an RGB unit. Surface mounted RGB units usually have four pins. The first, second, and third pins may respectively correspond to the red, green, and blue LEDs. The fourth pin may correspond to either a common anode or a common cathode of the LEDs.

An LED driving circuit delivers power to the array of LEDs and controls the current delivered to the array of LEDs. The driving circuit may be a single channel driver or a multi-channel driver. Each channel of the driving circuit may deliver power to a plurality of LEDs and control the current delivered to the LEDs. When a group of LEDs is electrically coupled to the same channel, the group of LEDs are often referred to as a "scan line."

In general, LED driving circuits control the brightness of the LEDs by varying the current delivered to and flowed through the LEDs. In response to the delivered current, the LED emits light with a brightness in accordance with the characteristic specifications of the LED. A greater current delivered to the LED usually translates to a greater intensity of brightness. To effectively control the delivery of current, LED driving circuits may employ a constant current source in combination with the modulation (i.e., turning ON and OFF) of the constant current, using, for example, Pulse Width Modulation (PWM).

FIG. 1A illustrates an ideal PWM signal 110 having a width W and an amplitude A for each PWM cycle. By varying width W of PWM pulse 110, the LED driving circuits may effectively deliver proper driving currents to the LEDs, so as to illuminate light at different shades of gray scale. When delivering the PWM signal, the driving circuit may see different load characteristics for each LED. Such variability of load characteristics may be constituted by a number of accumulating effects, such as the variation of forward voltage $V_f$ for each LED, the variation of intrinsic impedance for each scan line, and the variation of the response to forward current $I_f$ for each LED. These effects cause huge variations of brightness amongst the LEDs, especially at low gray scale settings. FIG. 1B illustrates an exemplary PWM signal 120 as seen in the driving circuit due to the variability.

Further, at a low gray scale setting, width W of a PWM signal may be sufficiently narrow, such that the pulses of the PWM signal may be lost due to the uncompensated nature of the driving current and the load characteristics. Accordingly, system designers have resorted to a pre-emphasis methodology to overcome the distortion of the PWM signals on PCB traces.

FIG. 1C illustrates an ideal PWM signal 130 with a pre-emphasis portion 135 at the beginning of each PWM cycle. In general, pre-emphasis portion 135 has a duration or width D, which is usually less than width W of a regular PWM cycle, and an amplitude A' greater than amplitude A of a regular PWM cycle. In the driving circuit for LED display panels, a PWM current signal may be corrected with pre-emphasis, so as to overcome or compensate signal distortions at the rise time. FIG. 1D illustrates an exemplary PWM signal 140 as seen in the driving circuit, with pre-emphasis.

In low gray scale settings, however, duration D of pre-emphasis portion 135 may be proximate or greater than width W of a PWM cycle. Accordingly, even with pre-emphasis, the PWM driving signal may still be distorted, resulting in short pulses and/or accompanying with PWM ringing. Consequently, the PWM driving signal may require further processing, especially for the cases of low gray scale settings.

SUMMARY OF INVENTION

The present disclosure provides devices, circuits, and methods for driving an LED display panel, so as to ensure the delivery of equal global charge at minimum gray scale.

In one embodiment, a method is provided for driving an LED display panel. The method includes initializing a plurality of LEDs of the LED display panel, and operating the LED display panel by supplying a driving signal to the LEDs so as to illuminate light with desired brightness. Initializing the LEDs includes determining a compensation parameter of the LEDs. Operating the LED display panel includes generating a pre-determined driving signal, modifying the pre-determined driving signal of the LEDs using the compensation parameter to obtain a modified driving signal, and supplying the modified driving signal to the LEDs.

In one embodiment, a circuit is provided for ensuring full content cycle lighting of an LED array having a plurality of LEDs. The circuit includes a current source configured to generate a current signal for the LEDs, a detection module configured to detect a forward voltage of the LEDs in response to a low current applied to the LEDs, the detection module further configured to hold the detected forward voltage, and a measurement module configured to measure a time period for an anode voltage of the LEDs to rise to the detected forward voltage in response to a display current applied to the LEDs.

In one embodiment, a circuit is provided for driving an LED display panel having a plurality of LEDs. The circuit includes an initialization unit and an operation unit. The initialization unit includes a detection module and a measurement module. The detection module is configured to detect a forward voltage of the LEDs in response to a low current applied to the LEDs. The detection module is further configured to hold the detected forward voltage. The measurement module is configured to measure a time period for an anode voltage of the LEDs to rise to the detected forward voltage in response to a display current applied to the LEDs. The operation unit includes a signal generator configured to generate a driving signal, a compensation module configured to modify the driving signal in accordance with the measured time period, and a current driver configured to receive the modified driving signal and, in response to the modified driving signal, transmit a driving current to the LEDs, so as to illuminate light with desired brightness.

DESCRIPTIONS OF DRAWINGS

The teachings of the present disclosure can be readily understood by considering the following detailed description in conjunction with the accompanying drawings.

Figure 1A:
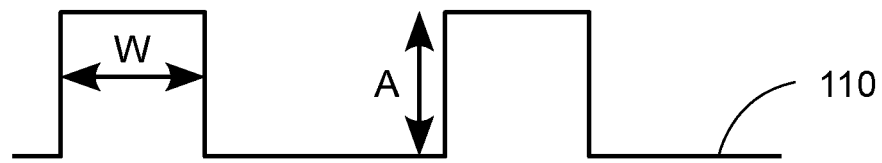
FIG. 1A illustrates an ideal pulse width modulation signal.
Figure 1B:
FIG. 1B illustrates an exemplary pulse width modulation signal as seen in a driving circuit, without pre-emphasis.
Figure 1C:
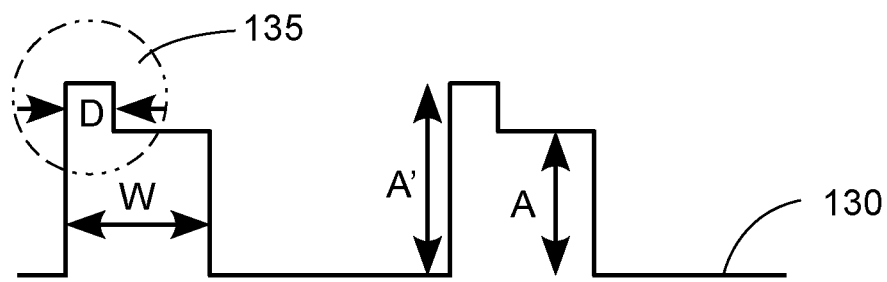
FIG. 1C illustrates an ideal pulse width modulation signal with a pre-emphasis portion at the beginning of each cycle.
Figure 1D:
FIG. 1D illustrates an exemplary pulse width modulation signal as seen in a driving circuit, with pre-emphasis.
Figure 2:
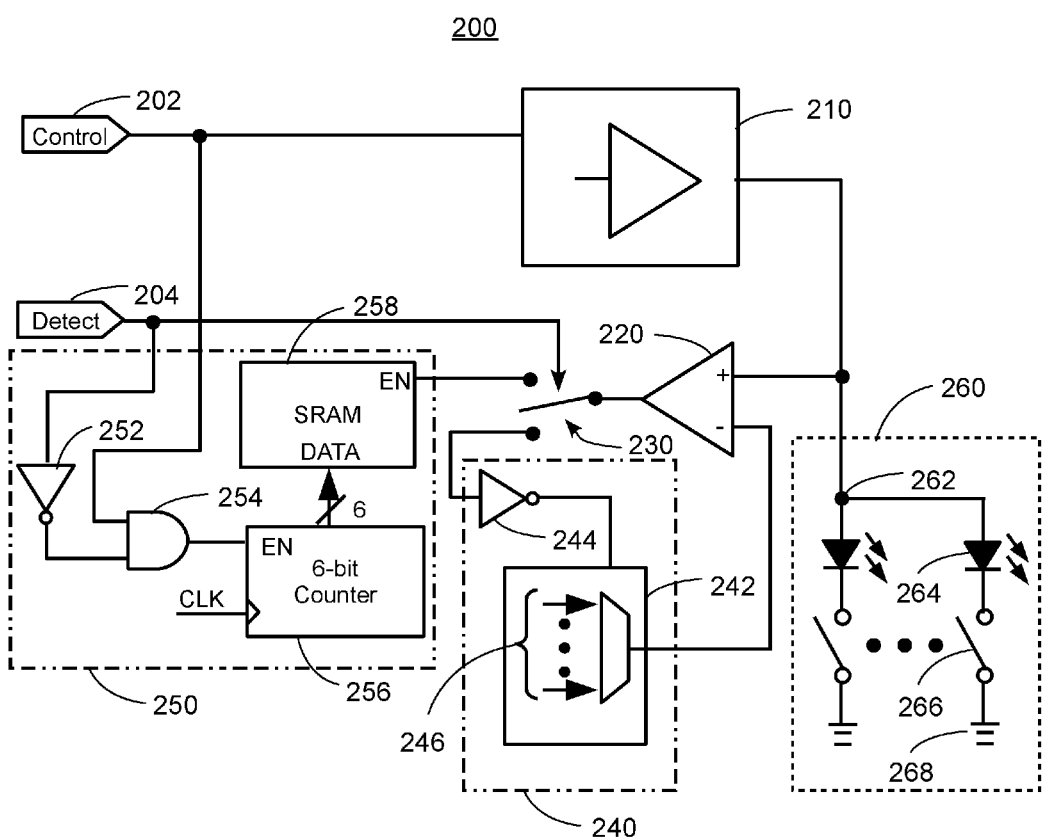

FIG. 2 schematically illustrates a circuit in accordance with one embodiment of the present disclosure.

Figure 3:
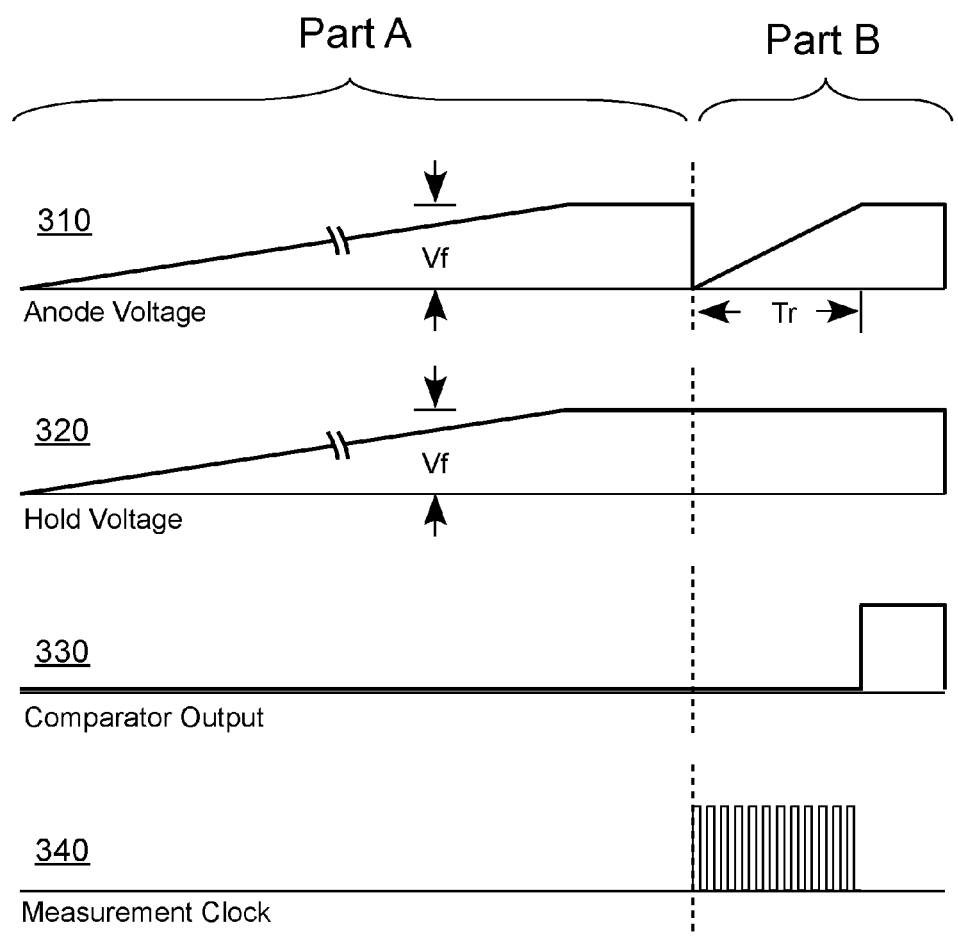

FIG. 3 schematically illustrates a timing diagram in accordance with one embodiment of the present disclosure.

Figure 4:
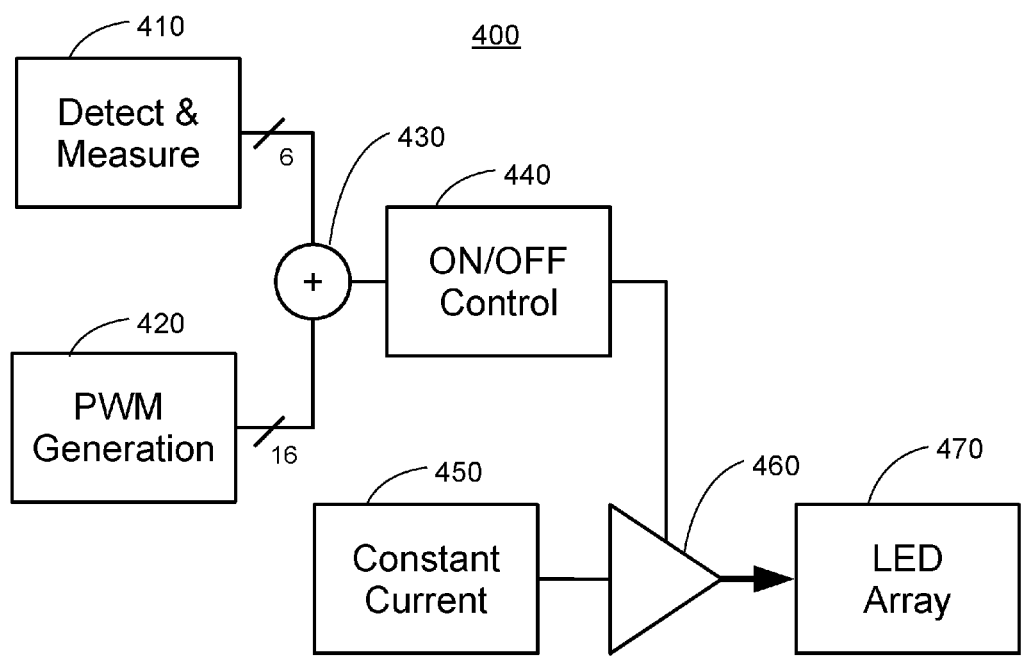

FIG. 4 schematically illustrates a circuit in accordance with another embodiment of the present disclosure.

DETAILED DESCRIPTION OF THE EMBODIMENT

The Figures (FIG.) and the following description relate to the embodiments of the present disclosure by way of illustration only. It should be noted that from the following discussion, alternative embodiments of the structures and/or methods disclosed herein will be readily recognized as viable alternatives that may be employed without departing from the principles of the claimed inventions.

Reference will now be made in detail to several embodiments of the present disclosure(s), examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

The present disclosure relates to a device, an integrated circuit, and a method to control pixels of an LED display panel and to ensure full content cycle lighting (FCCL). Additionally, the present disclosure relates to a device, an integrated circuit, and a method to compensate for system related variability that causes brightness variations from LEDs in an LED array, so as to ensure the delivery of equal global charge at minimum gray scale settings. These system related effects may be accumulated and cause minimum pulses (i.e., PWM signals at low gray scale settings) to have large variations in different LED channels and/or in different chips. Hence, it would be advantageous to know the direct impedance and the response characteristics of each LED in the scan lines, so as to compensate for the corresponding system related effects. This would guarantee that intended charge be delivered to the LED, regardless of forward voltage $V_f$ specification of the LED, or the relative position and/or consequential impedance effect of the LED in the string of an LED array.

In general, a method for driving an LED display panel may include an initialization step and an operation step. The initialization step may include powering on the LED display panel and testing LEDs of the LED display panel; while the operation step may include selecting a scan line from a plurality of scan lines of an LED array, sequentially supplying electric power to each of the LEDs on the selected scan line, and repeating the selecting step and the supplying step until the LEDs on all scan lines are illuminated to display a screenshot. The operation step may be repeated for displaying motion pictures.

In one embodiment, the LED driving method of the present disclosure may include a method for compensating system related variability, which may be incorporated with the initiation step and/or the operation step of the LED driving method. The compensating method of the present disclosure may include a preparation step and a modification step. The preparation step of the compensating method may include a detection step and a measurement step. The preparation step may be performed immediately after powering on the LED display panel. Alternatively, depending on design preferences, the preparation step of the compensating method may also be performed during the operation step of the LED driving method. Further, the modification step of the compensating method may be incorporated with the operation step of the LED driving method. In one embodiment, the modification step may include extending the width of an uncompensated PWM current signal when supplying electric power to an LED.

FIG. 2 schematically illustrates an FCCL circuit 200 that can be used to implement the method for compensating system related variability, in accordance with one embodiment of the present disclosure. As shown in FIG. 2, FCCL circuit 200 includes a channel output 210, a comparator 220, a three-terminal switch 230, a detection module 240, and a measurement module 250.

Channel output 210 may receive a control signal from a control terminal 202 and, in response to the control signal, deliver a display current to an LED array 260. LED array 260 includes a plurality of LEDs 264, which may be arranged in rows and columns. In one embodiment, plural LEDs 264 may be electrically coupled to a common anode 262 to form a channel. It is to be understood that, in other embodiments, LEDs 264 may be electrically coupled to a common cathode. Common anode 262 may be electrically coupled to the non-inverting input (+) of comparator 220. Comparator 220 may compare voltages at its non-inverting input (+) and inverting input (−), and send output to a first terminal of three-terminal switch 230.

In one embodiment, LED array 260 may include a plurality of channels and each channel may be driven by an independent driver circuit. For purposes of illustration, however, only one channel of LEDs 264 is shown in FIG. 2. In one embodiment, the cathode of each LED 264 is electrically coupled to one end of a two-terminal switch 266, while the other end of two-terminal switch 266 is coupled to ground 268. Switch 266 may be used to select its corresponding LED 264 to be illuminated.

In one embodiment, detection module 240 comprises a multiplexer 242 and an inverter 244 (or NOT gate 244). Multiplexer 242 receives input from a precision voltage divider 246 and transmits output to the inverting input (−) of comparator 220. Inverter 244 receives input from a second terminal of three-terminal switch 230 and transmits output to multiplexer 242 to hold voltage.

Measurement module 250 includes an inverter 252, an AND gate 254, a counter 256, and a storage unit 258. Inverter 252 receives input from a detect terminal 204 and send the inverted input to a first input terminal of AND gate 254. A second input terminal of AND gate 254 receives an input from terminal 202. AND gate 254 processes the input at the first and second terminals based on AND logic and transmits the result to the enable pin of counter 256. In this embodiment, counter 256 is a 6-bit counter.

Once enabled, counter 256 begins counting the number of clock cycles in accordance with a clock signal CLK sent to counter 256 until counter 256 is disabled. The resulting number of clock cycles is then transmitted to storage unit 258 for future uses. In this embodiment, storage unit 258 is a static random access memory (SRAM). The enable pin of storage unit 258 is electrically coupled to a third terminal of three-terminal switch 230.

Three-terminal switch 230 may be switched between a first state and a second state. In this embodiment, the first state of switch 230 constitutes an electrical conduction between the first terminal and the second terminal of switch 230, and an electrical insulation between the first terminal and the third terminal of switch 230. That is, in the first state, a conductive path is formed between comparator 220 and detection module 240. Likewise, in this embodiment, the second state of switch 230 constitutes an electrical conduction between the first terminal and the third terminal of switch 230, and an electrical insulation between the first terminal and the second terminal of switch 230. That is, in the second state, a conductive path is formed between comparator 220 and measurement module 250. Switch 230 may be controlled by a detection signal through terminal 204.

FIG. 3 illustrates a timing diagram for the compensating method according to one embodiment of the present disclosure. As discussed above, the compensating method includes a preparation step and a modification step. The preparation step further includes a detection step, which is illustrated as Part A in FIG. 3, and a measurement step, which is illustrated as Part B in FIG. 3. In one embodiment, the preparation step may be performed using the circuit illustrated in FIG. 2.

Hereafter, the method for driving an LED display panel according to one embodiment of the present invention will be discussed in more detail with reference to FIGS. 2 and 3. In Part A, detection of forward voltage $V_f$ for a particular LED is performed. In Part B, precision measurement of a time period $T_r$ required to reach forward voltage $V_f$ is taken.

Part A—Detection of forward voltage $V_f$

In the detection step, three-terminal switch 230 is turned to the first state. Initially, an LED of LED array 260 is selected. Channel output 210 then forces a low current into the selected LED. Timing diagram 310 in FIG. 3 illustrates the anode voltage of the selected LED. As shown in Part A of FIG. 3, the anode voltage (or the voltage at non-inverting input (+) of comparator 220) increases slowly and stabilizes at forward voltage $V_f$. In one embodiment, the low current is about 2.0 mA or less, and forward voltage $V_f$ is about 2.2 volts.

In this embodiment, voltage multiplexer 242 is used to accurately measure forward voltage $V_f$ across the selected LED. Voltage multiplexer 242 may be programmed by high resolution values in small steps to accurately measure voltage variations across different LEDs. That is, voltage multiplexer 242 may be used to increase the voltage at inverting input (−) of comparator 220 in small steps. In one embodiment, voltage multiplexer 242 includes a voltage divider, which may increase voltage in an increment of 0.1 volts.

When the voltage at inverting input (−) of comparator 220 is equal to or slightly greater than forward voltage $V_f$ at non-inverting input (+) of comparator 220, detection module 240 holds that voltage. Timing diagram 320 in FIG. 3 illustrates the hold voltage obtained through detection module 240. Three-terminal switch 230 is turned to the second state once the hold voltage is obtained.

Part B—Measurement of time period $T_r$

In Part B, forward voltage $V_f$ is measured once again with respect to the hold voltage obtained in Part A. This time, the measurement focuses on the amount of time (i.e., time period $T_r$) that is required for anode voltage to reach forward voltage $V_f$. Initially, a display current is applied to the selected LED. In one embodiment, as soon as the display current is applied, counter 256 is enabled and begins to count the number of clock cycles. FIG. 3 illustrates a high resolution clock signal 340 that may be used to take measurement of time period $T_r$.

In response to the display current, anode voltage 310 (or the voltage at non-inverting input (+) of comparator 220) increases from zero to forward voltage $V_f$ and stays at forward voltage $V_f$. Because the voltage at inverting input (−) of comparator 220 stays at the hold voltage, comparator output 330 (i.e., the voltage at the first terminal of switch 230) switches from Low to High, once anode voltage 310 reaches or exceeds the hold voltage. As a result, storage unit 258 is enabled to store the number of counted clock cycles when the output of comparator 220 switches. The number of counted clock cycles may correspond to time period $T_r$ that is required to reach forward voltage $V_f$. Time period $T_r$ may then be used as a compensation parameter during the compensation phase to modify the PWM driving signal. It is to be noted that the detection step (Part A) and the measurement step (Part B) may be repeated until the compensation parameters for all of the LEDs in LED array 260 are obtained.

FIG. 4 illustrates a schematic circuit in accordance with one embodiment of the present disclosure. In one embodiment, the modification step may be performed using the circuit illustrated in FIG. 4. As shown in FIG. 4, an LED driving circuit 400 includes an initialization unit 410, a PWM generation unit 420, an adding unit 430, an ON/OFF control unit 440, a current driver 460, and a constant current controller 450.

Initialization unit 410 may detect forward voltage $V_f$ of LEDs and measure time period $T_r$ for a driving signal to reach forward voltage $V_f$. Time period $T_r$ measured by initialization unit 410 may be used as a compensation parameter to modify a normal PWM driving signal. In one embodiment, initialization unit 410 may include FCCL circuit 200 as shown in FIG. 2. In one embodiment, time period $T_r$ may be measured by performing the steps in Part A and Part B, described above.

PWM generation unit 420 may generate a pre-determined PWM signal that may be used to drive an LED array 470. Adding unit 430 may be used to modify the pre-determined PWM signal using the compensation parameter determined in initialization unit 410. In one embodiment, adding unit 430 is used to delay the pre-determined PWM signal using the compensation parameter. The delayed PWM signal is then sent to ON/OFF control unit 440.

ON/OFF control unit 440 generates a control signal based on the delayed PWM signal and sends the control signal to current driver 460. Constant current controller 450 controls current driver 460 to generate constant currents. The constant currents may then be modulated by the control signal from ON/OFF control unit 440, thereby generating and delivering a PWM current signal to LED array 470.

Compensation of the PWM driving signal may be performed during the normal operation of an LED display panel. It is noted that the 6-bit value of the measured rise time $T_r$ for every LED may be dynamically added to the PWM word as a part of the normal color and brightness calibration compensation. When applying the PWM pulse to an LED, the value of the measured time period $T_r$ may be used as a compensation by adding the value to the tail-end of the PWM driving signal as a delay. Because rise time $T_r$ of forward voltage $V_f$ may effectively capture the accumulating effects in an LED display panel, the driving circuit and method of the present disclosure can ensure that equal global charge is delivered to all LEDs at minimum gray scale settings.

Many modifications and other embodiments of the disclosure will come to the mind of one skilled in the art having the benefit of the teaching presented in the forgoing descriptions and the associated drawings. For example, the driver circuit can be used to drive an LED array in either common cathode or common anode configuration. Elements in the LED array can be single color LEDs or RGB units or any other forms of LEDs available. The driver circuit can be scaled up or scaled down to drive LED arrays of various sizes. Multiple driver circuits may be employed to drive a plurality of LED arrays in a LED display system. The components in the driver can either be integrated on a single chip or on more than one chip or on the PCB board. Such variations are within the scope of this disclosure. It is to be understood that the disclosure is not to be limited to the specific embodiments disclosed, and that the modifications and embodiments are intended to be included within the scope of the dependent claims.

What is claimed is:

1. A circuit for ensuring full content cycle lighting of a light emitting diode array having a plurality of LEDs, the circuit comprising:
   a current source that generates a current signal for the LEDs;
   a detection module including an inverter and a multiplexer that detects a forward bias voltage of the LEDs in response to a low current applied to the LEDs, the detection module further holds the detected forward bias voltage; and
   a measurement module including a counter and a storage unit that measures a time period for an anode voltage of the LEDs to rise to the detected forward bias voltage in response to a display current applied to the LEDs.

2. The circuit of claim 1, further comprising:
   a comparator; and
   a three-terminal switch electrically coupled to an output of the comparator, the three-terminal switch being switchable between a first state and a second state,
   wherein the first state forms an electrical conduction between the comparator and the detection module, and the second state forms an electrical conduction between the comparator and the measurement module.

3. The circuit of claim 2, wherein the multiplexer is configured to transmit voltage signals in increments to the comparator.

4. The circuit of claim 2, wherein the
   counter is configured to count a number of clock cycles while the anode voltage is lower than the detected forward bias voltage, the number of clock cycles corresponding to the measured time period; and
   the storage unit is configured to retain the measured time period.

5. The circuit of claim 4, wherein the counter is a six-bit counter and the storage unit is a static random access memory.

6. The circuit of claim 1, wherein the low current is about 2.0 mA or less, and the forward bias voltage is about 2.2 Volts.

7. A circuit for driving a light emitting diode (LED) display panel having a plurality of LEDs, the circuit comprising:
   an initialization unit; and
   an operation unit,
   wherein the initialization unit comprises:
      a detection module including an inverter and a multiplexer configured to detect a forward bias voltage of the LEDs in response to a low current applied to the LEDs, the detection module further configured to hold the detected forward bias voltage; and
      a measurement module including a counter and a storage unit configured to measure a time period for an anode voltage of the LEDs to rise to the detected forward bias voltage in response to a display current applied to the LEDs, and
   wherein the operation unit comprises:
      a signal generator configured to generate a driving signal;
      a compensation module configured to modify the driving signal in accordance with the measured time period; and
      a current driver configured to receive the modified driving signal and, in response to the modified driving signal, transmit a driving current to the LEDs, so as to illuminate light with desired brightness.

8. The circuit of claim 7, wherein the driving signal is a pulse width modulation (PWM) voltage signal.

9. The circuit of claim 8, wherein the compensation module is configured to extend a width of the PWM voltage signal based on the measured time period.

10. An LED display panel, comprising a plurality of LEDs and the circuit as recited in claim 7, wherein the circuit supplies the driving current to the LEDs.

* * * * *